United States Patent [19]

Umeda et al.

[11] Patent Number: 4,591,886
[45] Date of Patent: May 27, 1986

[54] DRIVING METHOD AND APPARATUS FOR OPTICAL PRINTER WITH LIQUID-CRYSTAL SWITCHING ELEMENT

[75] Inventors: Takao Umeda, Hitachi; Kazuya Ooishi, Toukai; Tatsuo Igawa, Kitaibaraki; Yasuro Hori, Katsuta; Yoshiharu Nagae; Masato Isogai, both of Hitachi, all of Japan

[73] Assignee: Hitachi, Ltd., Tokyo, Japan

[21] Appl. No.: 629,045

[22] Filed: Jul. 9, 1984

[30] Foreign Application Priority Data

Jul. 8, 1983 [JP] Japan ................. 58-123305

[51] Int. Cl.$^4$ ............... G01D 15/14; H04N 1/23; H04N 1/29
[52] U.S. Cl. .................... 346/160; 358/300; 350/350 S; 350/356
[58] Field of Search ............ 346/107 R, 108, 160; 358/300, 302; 350/332, 335, 350 S, 356

[56] References Cited

U.S. PATENT DOCUMENTS 4,449,153  5/1984  Tschang ............... 346/108
4,508,429  4/1985  Nagae et al. .......... 350/350 S

FOREIGN PATENT DOCUMENTS 57-63509  4/1982  Japan .

Primary Examiner—E. A. Goldberg
Assistant Examiner—Patrick W. Foster
Attorney, Agent, or Firm—Antonelli, Terry & Wands

[57] ABSTRACT

A driving method for an optical printer and an optical printer having a liquid-crystal light switching element including a ferroelectric liquid crystal sandwiched between a pair of plates provided with electrodes on adjacent surfaces thereof. The liquid-crystal light switching element is disposed between a light source and a movable photosensitive surface and controlled so as to at least one of transmit and block light from the light source to the photosensitive surface for enabling a printing operation. Voltages $v_1$ and $v_2$ are applied to the liquid-crystal switching element substantially in accordance with the equation $$\int_{t_0}^{t_1} v_1 dt + \int_{t_2}^{t_3} v_2 dt = 0$$

and the intensity of light from the light source incident on the liquid-crystal switching element is controlled so that incident light intensity during a period $T_2$ is weaker than the incident light intensity during a period $T_1$, where $t_0$, $t_1$, $t_2$ and $t_3$ represents times, $T_1$ ($=t_1-t_0$) is the period during which a printing operation is effected, $T_2$ ($=t_3-t_2$) is the period during which the photosensitive surface moves, $v_1$ is the voltage which is applied to the liquid-crystal switching element during the period $T_1$, and $v_2$ is the voltage which is applied to the liquid-crystal switching element during the period $T_2$.

19 Claims, 48 Drawing Figures

FIG. 3(a)  FIG. 3(b)  FIG. 3(c)
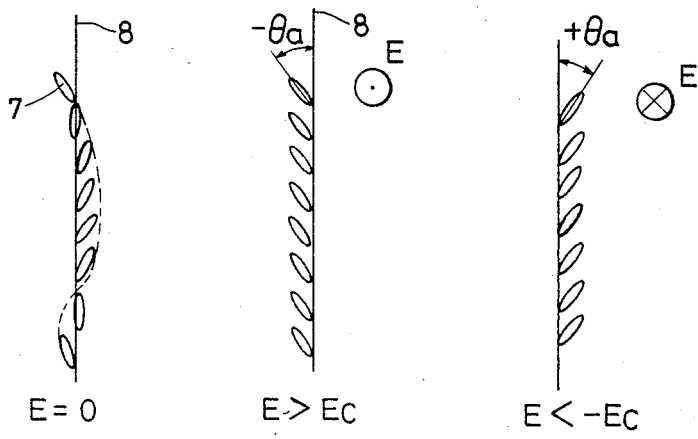
FIG. 4(a)
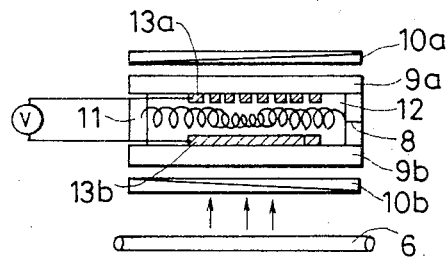
FIG. 4(b)  FIG. 4(c)
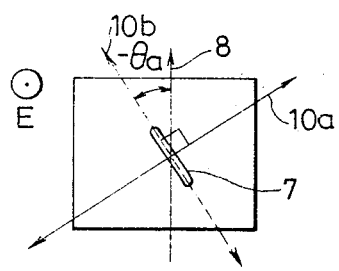 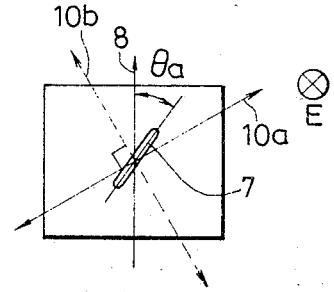

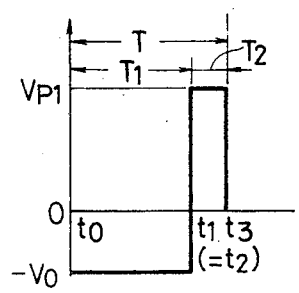
FIG. 9(a)
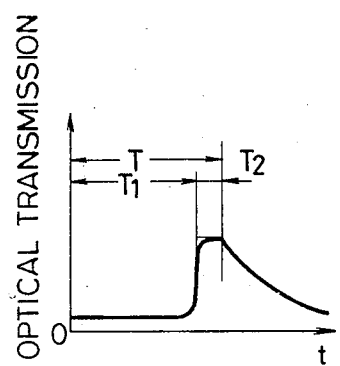
FIG. 9(b)
FIG. 10
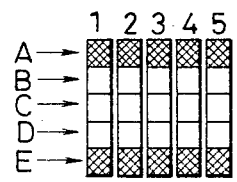

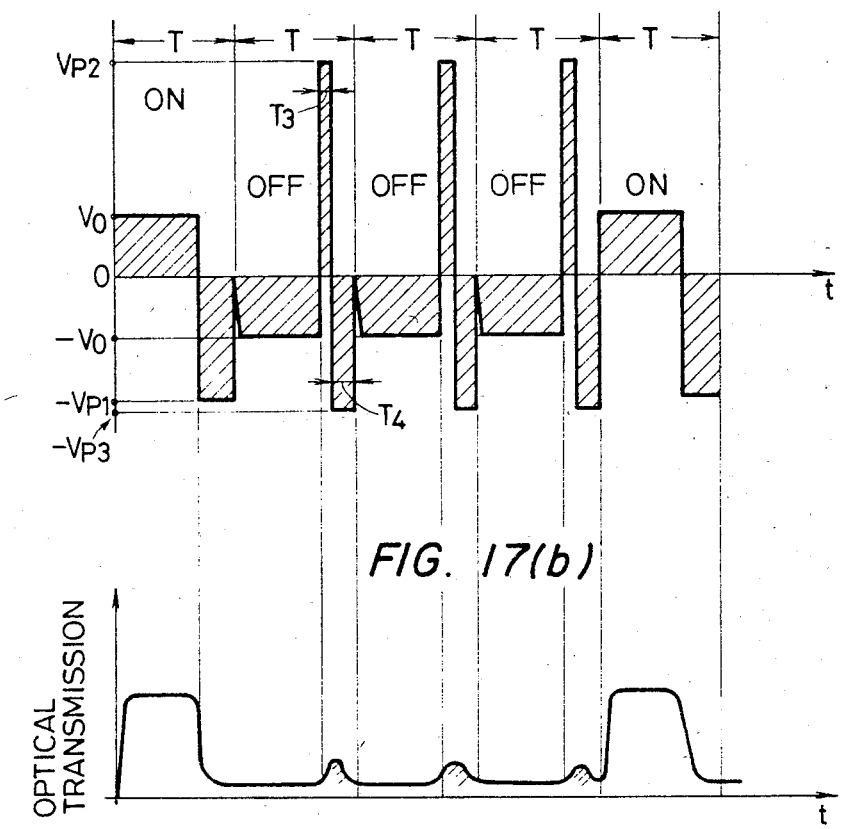

DRIVING METHOD AND APPARATUS FOR OPTICAL PRINTER WITH LIQUID-CRYSTAL SWITCHING ELEMENT

BACKGROUND OF THE INVENTION

The present invention relates to the driving method of switching elements using a liquid crystal for a printer and, more particularly, to the driving method of optical switching elements for a printer using a ferroelectric liquid crystal.

In recent years, investigation has been made into compact printers of the electrophotographic type, which use an optical signal generator composed of a liquid-crystal switching element and a light source. The construction of such a compact printer is shown in FIG. 1. Reference numeral 3 denotes a liquid-crystal switching element which is composed of about 2,000 shutter portions 4 of a very small area. The light emitted by a light source 6, such as a fluorescent lamp, is focused onto the surface of the liquid-crystal switching array with a cylindrical lens 5. The light transmitted through shutter portions which are selected by electrical signal, illuminates the surface of a photoconductive drum 1 through a lens system such as a linear SELFOC lens. The characteristics required for the liquid-crystal switching element includes a high-speed response. In order to obtain a line printer with a resolution of 10 dots/mm and a printing speed 1,000 lines/min. it is necessary that the on/off cycle-time is less than 1 or 2 msec.

This high-speed response cannot be obtained using twisted nematic crystals of the prior art, and a system using a twisted nematic display panel liquid-crystal element by two-frequency addressing has been proposed (in Japanese Patent Laid-Open No. 57-63509). However, this type of liquid crystal material has the problem that a cut-off frequency $f_c$ varies widely with temperature. When used as a liquid-crystal switching element for a printer, the temperature of the liquid crystals is increased (to about 40° to 50° C.) by the heat of the light source so that this must be compensated for. Thus, a twisted nematic liquid crystal element utilizing two frequency addressing is not suitable.

This type of liquid crystal also has another problem in that the reduction of the response time is limited to 1 to 2 msec., so that high-speed printing cannot be accomplished.

SUMMARY OF THE INVENTION

As object of the present invention is to provide a driving method of a liquid-crystal switching element of a printer, which can eliminate these defects and can accomplish high-quality print at a high speed.

The driving method of a liquid-crystal switching element of a printer which can achieve the object of the present invention is characterized in that a ferroelectric liquid crystal such as a liquid crystal with a chiral smectic C phase or a liquid crystal with a chiral smectic H phase is used as a liquid crystal material and the following equation is substantially satisfied:

$$\int_{t_0}^{t_1} v_1 dt + \int_{t_2}^{t_3} v_2 dt = 0$$

where the voltage applied to a ferroelectric liquid crystal for printing is $v_1$, the period during which the voltage $v_1$ is applied is $T_1$ ($=t_1-t_0$), the period during which a photoconductive drum is moving is $T_2$ ($=t_3-t_2$), and the voltage applied to a ferroelectric liquid crystal during the period $T_2$ is $V_2$.

In a preferred mode of embodiment of the present invention, $T_1 \geq T_2$ and/or $t_1 = t_2$.

In another preferred mode of embodiment of the present invention, a voltage with a peak of one polarity (e.g., negative) is applied during at least a portion of the period $T_2$, and preferably the voltage applied finally during the period $T_2$ has a peak of the one polarity (e.g., negative).

In yet another preferred mode of embodiment of the present invention, the intensity of the light incident on the liquid-crystal switching element from a light source during the period $T_2$ is weaker than that during the period $T_1$, and is preferably substantially zero.

BRIEF DESCRIPTION OF THE DRAWINGS

FIG. 3 shows the response to an electric field of a ferroelectric liquid crystal molecules used in the embodiments of the present invention;

FIGS. 4 to 6 are views of schematic constructions of the liquid-crystal switching elements used in embodiments of the present invention;

FIGS. 8 to 11 are graphs of characteristics of the first embodiment of the present invention;

FIGS. 16 and 17 are graphs of the characteristics of the third embodiment of the present invention;

DESCRIPTION OF THE PREFERRED EMBODIMENTS

The present invention will be described specifically in the following in connection with embodiments thereof.

Figure 2:
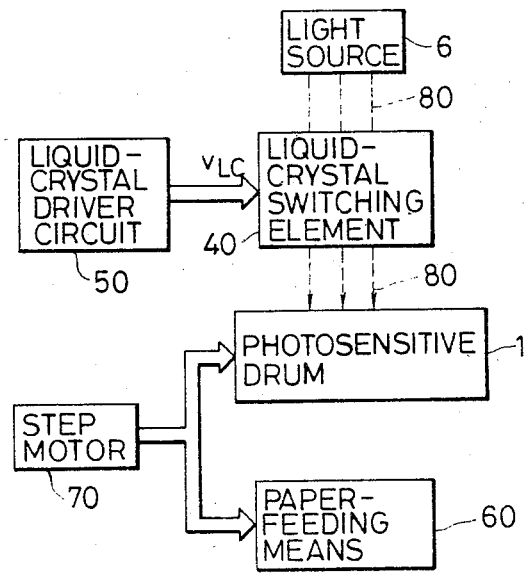

FIG. 2 is a diagram of a printer used for one embodiment of the present invention.

Reference numeral 1 denotes a photoconductive drum, and numeral 6 a light source such as a fluorescent lamp. Numeral 40 denotes a liquid-crystal switching element using a ferroelectric liquid crystal material, as will be described below. Numeral 50 denotes a liquid-crystal driver which generates a voltage $V_{LC}$ to drive the liquid-crystal switching element 40, numeral 60 denotes paper-feeding means for feeding paper being printed by one or more lines, linked to the photoconductive drum 1, numeral 70 denotes a step motor which simultaneously actuates the photoconductive drum 1 and the paper-feeding means 60, and numeral 80 denotes light rays from the light source. Since the present invention is not directed to the structure of the printer itself, details of the printer structure can be obtained from Japanese Patent Laid-Open No. 63509/1982.

The electro-optical characteristics of ferroelectric liquid crystal used in the present invention will be described in the following.

Ferroelectric liquid crystals include known liquid crystals which have a chiral smectic C(Sm*C) phase or a chiral smectic H(Sm*H) phase, such as those tabulated in Table, for example.

TABLE 1

$$C_nH_{2n+1}O-\underset{}{\bigcirc}-CH=N-\underset{}{\bigcirc}-CH=CHCOCH_2{}^*CHC_2H_5$$
(with O double-bonded above C, and CH$_3$ above the chiral carbon)

Ex. n = 1 4 TDOBAMBC
n = 1 2 DDOBAMBC
n = 1 0 DOBAMBC
n = 8 OOBAMBC
n = 6 HOBAMBC $$C_nH_{2n+1}O-\underset{}{\bigcirc}-CH=N-\underset{}{\bigcirc}-CH=CHCOCH_2{}^*CCH_3$$
(with O double-bonded, H and Cl on chiral carbon)

Ex. n = 6 HOBACPC
n = 8 OOBACPC
n = 1 0 DOBACPC $$C_nH_{2n+1}O-\underset{}{\bigcirc}-CH=N-\underset{}{\bigcirc}-CH=C\;COCH_2{}^*CHC_2H_5$$
(with ClO and CH$_3$ substituents)

Ex. n = 8 OOBAMBCC $$C_nH_{2n+1}O-\underset{}{\bigcirc}-CH=N-\underset{}{\bigcirc}-CH=CCOCH_2{}^*CHC_2H_5$$
(with N≡C, O, and CH$_3$ substituents)

Ex. n = 1 0 DOBAMBCC $$C_nH_{2n+1}O-\underset{}{\bigcirc}-CH=N-\underset{}{\bigcirc}-CH=CCCH_2{}^*CHC_2H_5$$
(with N≡C, O, and CH$_3$ substituents)

Ex. n = 1 4 TDOBAMBCC

The states of these ferroelectric liquid crystal molecules under an applied voltage are known from articles such as "Submicrosecond bistable electrooptic switching in liquid crystals" Appl. Phys, Lett. 36(11), June 1, 1980, p899-p901, and will now be described with reference to FIG. 3.

In the initial state when no electric field is applied, as shown in FIG. 3(a), ferroelectric liquid crystal molecules 7 are helically oriented at an angle $\theta_a$ with respect to a helical axis 8 (e.g., between 20 and 25 degrees for DOBAMBC).

If an electric field E higher than a threshold electric field $E_c$ is applied to the ferroelectric liquid crystal molecules 7, as shown in FIG. 3(b), liquid crystal molecules 7 are oriented into a plane normal to the direction of the electric field E so that their long axes are at an angle of $-\theta_a$ to the helical axis 8, because they have a spontaneous polarization. If the polarity of the electric field E of FIG. 3(b) is inverted, on the other hand, the liquid crystal molecules are oriented, as shown in FIG. 3(c), into the plane normal to the direction of the electric field E so that their long axes are at an angle of $\theta_a$ to the helical axis 8.

Figure 5A:
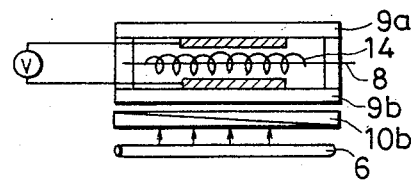
Figure 5B:
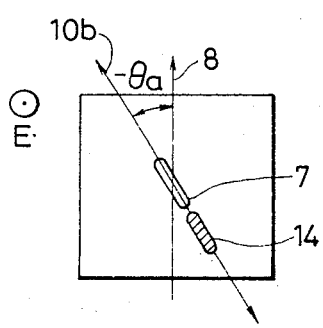
Figure 5C:
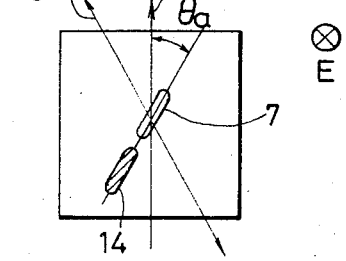
Figure 6:
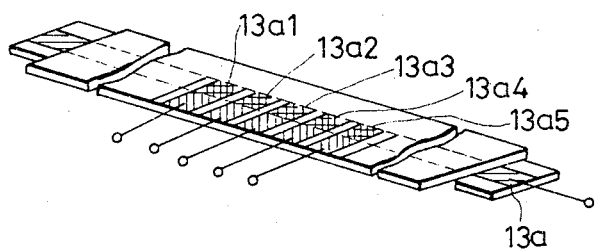

FIGS. 4 and 5 are schematic sections through liquid-crystal switching elements which are used in one embodiment of the present invention, and which make use of the electro-optic characteristics of the ferroelectric liquid crystal thus far described. FIG. 6 is a schematic perspective view of the liquid-crystal switching element of FIG. 4 or 5.

FIG. 4 shows an element in which two polarizing plates are used, and the birefringence of liquid crystal molecules are employed. FIG. 5 shows a guest-host typed element in which one polarizing plate is used, and dichroic dyes are mixed into ferroelectric liquid crystal materials so that the selective absorption of light by the dye can be used.

In FIG. 4(a), a liquid crystal 12 which is one of the ferroelectric liquid crystals of Table 1 is sandwiched between two transparent plates 9a and 9b of which adjacent principal surfaces are oriented horizontally. Reference numeral 11 denotes sealing materials. Initially, the helical axis 8 is generally parallel to the principal surfaces of the plates 9a and 9b. Those portions which are adjacent to transparent conductive films 13a and 13b formed on the adjacent surfaces of the plates 9a and 9b, respectively, form shutter portions. In FIG. 6, for example, five shutter portions are formed.

Within each shutter portion, when an electric field is applied to the liquid crystal layer between the adjacent transparent conductive films 13a and 13b the following changes occur. FIG. 4(b) illustrates to the case in which the electric field E applied to the liquid-crystal layer is directed from the reverse side up through the surface of the paper of the Figure (called "negative voltage application"). The liquid crystal molecules 7 during this time are oriented as in FIG. 3(b) so that their long axes are at the angle of $-\theta_a$ to the helical axis 8 (e.g., 22.5 degrees). As shown in FIG. 4(a) two polarizing plates 10a and 10b having respective polarizing axes crossed at 90 degrees from each other are provided on the sides of the plates 9a and 9b so that the polarization axis of one plate 10b is oriented in the same direction as the orientation direction of the liquid crystal molecules 7 (i.e., the direction of $-\theta_a$ with respect to the helical axis 8. As a result, as shown in FIG. 4(b), the light incident on the liquid-crystal switching element from the light source 6 is blocked by the polarizing plate 10a so that it is not transmitted therethrough. If the electric field E applied to the liquid crystal 12 is directed from the surface toward the reverse of the Figure (called "positive voltage application"), the liquid crystal molecules 7 fail to align with the direction of either of the polarization axes of the polarizing plates 10a and 10b, as shown in FIG. 4(c), so that the light is transmitted through the liquid-crystal switching element.

FIG. 5(a) shows the construction of a guest-host type liquid crystal switching element. The differences from the switching element of FIG. 4(a) lie in that one of the polarizing plates 10a is omitted, and in that into the liquid crystal 12a is mixed a dichroic dye (molecules) 14, which is mixture of one or more of an atraquinone derivative, an azo derivative, a diazo derivative, a merocyanine derivative, a tetrazine derivative, etc. When a negative voltage is applied in the same way as described with reference to FIG. 3(b), the liquid crystal molecules 7 and the dichroic dye molecules 14 are aligned so that their long axes are at the angle of $-\theta_a$ to the helical axis 8. If the long axes and absorption axes of the dichroic dye molecules are in the same direction, when the polarizing plate 10b is arranged so that its polaring axis is in the same direction as the orientation direction of liquid crystal molecules 7, the light entering the liquid crystal layer 12 from the light source 6 through the polarizing plate 10b is absorbed in the layer, because the direction of vibration of polarized light is the same as the absorption axes of the dichroic dyes. If a black dye is used as the dichroic dye, light is not transmitted through the liquid crystal layer 12. When a positive voltage is applied, on the other hand, the liquid crystal molecules 7 and the dichroic dye molecules 14 are oriented, as shown in FIG. 5(c), so that the direction of vibration of the polarized light and the direction of the absorption axes of the dichroic dye molecules 14 do not coincide. As a result, the light is transmitted through the liquid-crystal switching element without absorption by the dichroic dye.

Figure 7:
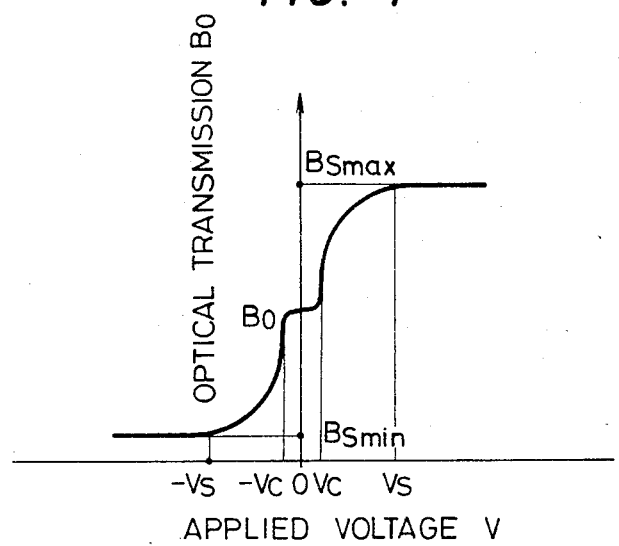
FIG. 7 is a graph of the relationship between the applied voltage and the optical transmission of the liquid-crystal switching elements used in embodiments of the present invention.

As has been described above, the light is transmitted if a positive voltage is applied, but is blocked if a negative voltage is applied. The response of the ferroelectric liquid crystal molecules is so fast that the switching speed of the switching element can be easily be equal to or less than 1 msec. FIG. 7 shows the relationship between applied voltage (peak value) V and optical transmission B of the liquid-crystal switching element. $V_c$ denotes a critical voltage.

(a) $-V_c \leq$ applied voltage $V \leq V_c$: the optical transmission B does not change at $B_0$.

(b) When the applied voltage V is higher than the critical voltage $V_c$, the optical transmission B starts to increase until it reaches a saturation value $B_{Smax}$ at Vhd S.

(c) If the absolute value of the applied voltage V exceeds $V_c$ when its polarity is negative, the optical transmission B starts to decrease until it reaches a saturation value $B_{Smin}$ at $-V_S$. Thus, the liquid-crystal switching element using a ferroelectric liquid crystal either allows light to pass or blocks it, depending on whether the polarity of the applied voltage is positive or negative.

EMBODIMENT 1

The driving method of a liquid-crystal switching element of a printer according to a first embodiment of the present invention will now be described with reference to FIGS. 8 and 9.

Consider the case in which the group of dots shown in FIG. 10 are to be printed on the photoconductive drum. The hatched dots A-1, A-2, A-3, A-4, A-5, E-1, E-2, E-3, E-4 and E-5 are those which are exposed to the light from the light source which has been transmitted through the liquid-crystal switching element (the "exposed dots"). The blank dots B-1, B-2, B-3, B-4, B-5, C-1, C-2, C-3, C-4, C-5, D-1, D-2, D-3, D-4 and D-5 are those which have not been exposed to the light from the light source, (the "unexposed dots"). If a one-line drive period is designated by T, the exposed dots A-1, A-2, A-3, A-4 and A-5 on line A are formed during the initial one-line drive period T by five shutter portions, and the photoconductive drum is then turned to move it photoconductive surface and the paper is fed on. During the next one-line drive period T, the unexposed dots B-1, B-2, B-3, B-4 and B-5 on line B are formed, and the paper-feeding operation is repeated. The dots on lines C, D and E are similarly formed.

Figure 8A:
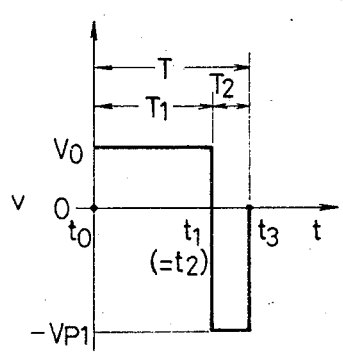
Figure 8B:
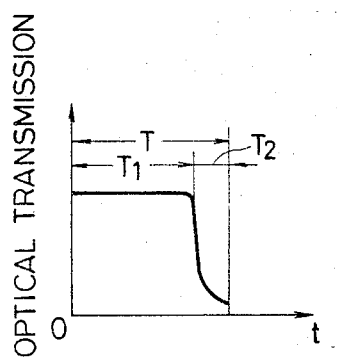

FIG. 8(a) shows the waveform of the voltage v applied during the one-line drive period T to the ferroelectric liquid crystal forming the individual shutter portions of the liquid-crystal switching element when the exposed dots A-1, A-2, A-3, A-4, A-5, E-1, E-2, E-3, E-4 and E-5 are formed. FIG. 8(b) shows an optical transmission of the liquid-crystal switching element. $T_1$ denotes the period during which a voltage is applied to the liquid crystal so that the light from the light source is either transmitted through or is blocked by the liquid-crystal switching element so that the photoconductive surface is printed (the "print period"), and $T_2$ denotes the period during which the photoconductive drum is turned so that its surface is moved (the "drive period").

When a positive pulse voltage with a peak value $V_0$ (between 5 V and 30 V) and a pulse width $T_1$ (between 500 μs and 1,200 μs) is applied from time $t_0$ to time $t_1$ during the print period $T_1$, as shown in FIG. 8(a), the light from the light source is transmitted through the liquid-crystal switching element to expose the dots. When a negative pulse voltage with a peak value of $-V_{p1}$ and a pulse width $T_2$ is applied from time $t_2(=t_1)$ to time $t_3$ during the drive period $T_2$, however, the light is abruptly blocked (as shown in FIG. 8(b)). By repeating these operations during a predetermined period T (between 1 ms and 30 ms) such that no flicker is generated, the average optical transmission can be made sufficiently high.

During this time, the DC component of the voltage $v_1$ determining the optical transmission for the printing operation is expressed by:

$$\int_{t_0}^{t_1} v_1 dt = V_0 \cdot T_1 \tag{1}$$

and the DC component of the voltage $v_2$ applied during the drive period $T_2$ is expressed by:

$$\int_{t_2}^{t_3} v_2 dt = -V_{p1} \cdot T_2 \tag{2}$$

where $V_0$, $V_{p1}$, $T_1$ and $T_3$ are determined to satisfy the following equation:

$$\int_{t_0}^{t_1} v_1 dt + \int_{t_2}^{t_3} v_2 dt = V_0 \cdot T_1 - V_{p1} \cdot T_2 = 0. \tag{3}$$

Consequently, the average value of the voltage applied to the liquid crystal is zero and has no DC component, so that (the ferroelectric liquid crystal is not affected by any electrochemical reactions). The deterioration of the liquid crystal, which is induced by an electrochemical reaction, does not occur.

FIG. 9(a) shows the waveform of the voltage v applied during the one-line drive period T to the liquid crystal forming the individual shutter portions of the liquid-crystal switching element, when the unexposed dots B-1, B-2, B-3, B-4, B-5, C-1, C-2, C-3, C-4, C-5, D-1, D-2, D-3, D-4 and D-5 are formed. FIG. 9(b) shows the optical transmission of the liquid-crystal switching element.

When a negative pulse voltage with a peak value of $-V_0$ and a pulse width $T_1$ is applied from time $t_0$ to time $t_1$ during the print period $T_1$, the light from the light source is blocked, as shown in FIG. 9(b), by the liquid-crystal switching element so that the unexposed dots are formed. From time $t_2(=t_1)$ to time $t_3$, a positive pulse voltage with a peak value $V_{p1}$ and a pulse width $T_2$ is applied during the drive period $T_2$.

During this time, the relationship between the DC component of the voltage $v_1$ applied to the ferroelectric liquid crystal during the print period $T_1$ and the DC component of the voltage $v_2$ applied during the drive period $T_2$ is expressed by:

$$\int_{t_0}^{t_1} v_1 dt + \int_{t_2}^{t_3} v_2 dt = -V_0 \cdot T_1 + V_{p1} \cdot T_2 = 0. \quad (4)$$

In FIG. 9, as well, the average value of the voltage applied to the liquid crystal is zero and has no DC component, so that the deterioration of the liquid crystal, which is induced by an electrochemical reaction, does not occur. As a result, it is possible to provide a high-speed, high-quality printing operation.

Figure 11A:
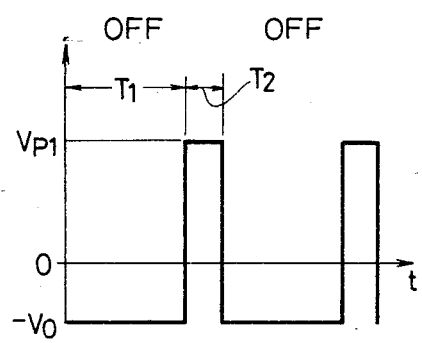
Figure 11B:
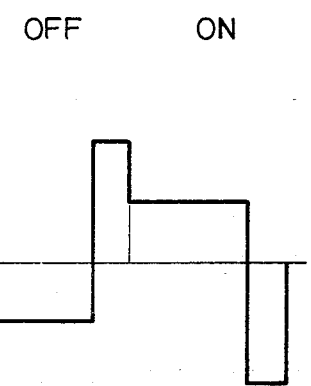
Figure 11C:
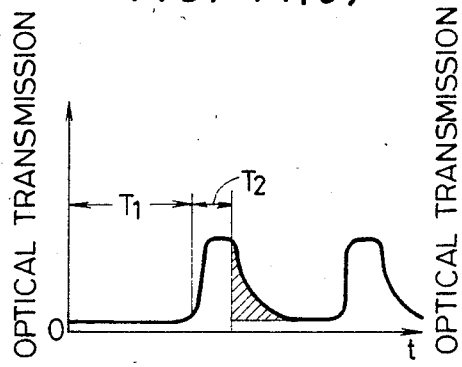
Figure 11D:
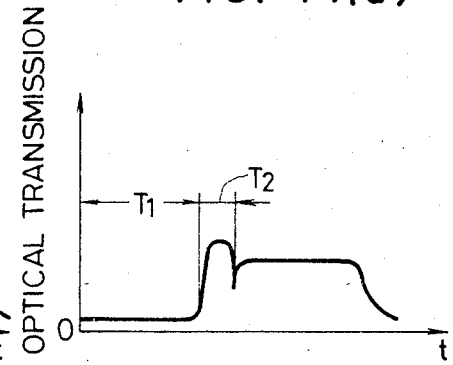

A practical application of the element to an optical switch array of a printer will now be considered. FIG. 11(a) shows the case in which unexposed dots are formed in the first print period (OFF), the unexposed dots are also formed in the next print period. FIG. 11(b) shows the case in which unexposed dots are formed in the first print period (OFF), but exposed dots are formed on the next print period (ON). The voltage waveform of FIG. 11(a) is two repeats of that of FIG. 9(a). The optical transmission during this time is shown in FIG. 11(c), in which there is not only an optical leakage during the drive period $T_2$, but also an optical leakage as a result of a response delay (e.g., about 0.5 msec. when $V_{p1}=40$ V and $-V_0=-20$ V), as shown by the hatched region, during the period in which the unexposed dots are formed. FIG. 11(b) shows a combined waveform of those of FIG. 9(a) and FIG. 8(a). The optical transmission during this time is shown in FIG. 11(d), illustrating the optical leakage during the drive period $T_2$ increases in the same way as in FIGS. 11(a) and (c).

EMBODIMENT 2

The drive voltage waveform of the liquid-crystal switching element of the printer which solves these problems, according to a second embodiment of the present invention, is shown in FIG. 12. In FIG. 12, reference characters identical to those of FIGS. 8 and 9 indicate identical or corresponding portions.

Figure 12A:
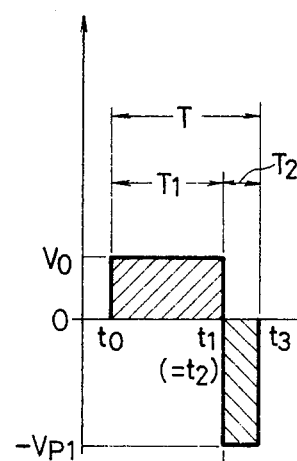
FIGS. 12 to 15 are graphs of characteristics of the second embodiment of the present invention.
Figure 12B:
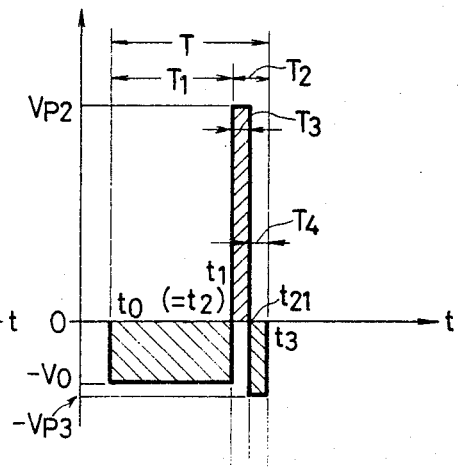
Figure 12C:
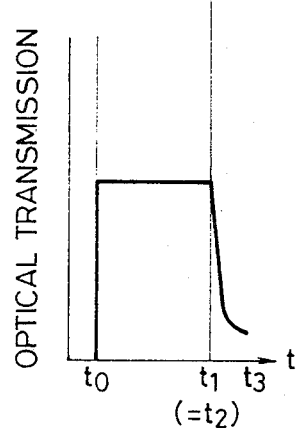

FIG. 12(a) shows the waveform of the voltage applied during the one-line drive period T to the ferroelectric liquid crystal forming the individual shutter portions of the liquid-crystal switching element, when the exposed dots are formed, and FIG. 12(c) shows the optical transmission during that time. FIGS. 12(a) and (c) correspond to FIGS. 8(a) and (b).

Figure 12D:
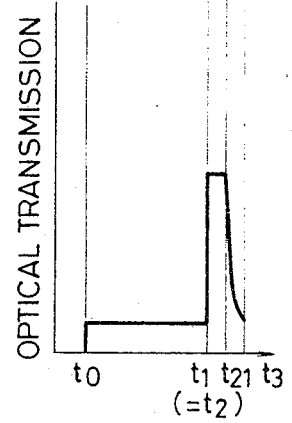

FIG. 12(b) shows the waveform of the voltage applied during the one-line drive period T to the liquid crystal forming the individual shutter portions of the liquid-crystal switching element, when the unexposed dots are formed, and FIG. 12(d) shows the optical transmission during that time. As shown in FIG. 12(b), a negative pulse voltage with a peak value of $-V_0$ and a pulse width $T_1$ is applied from time $t_0$ to $t_1$ during the print period $T_1$ to form the unexposed dots. During the drive period $T_2$ from time $t_1$ ($=t_2$) to time $t_3$, a positive pulse voltage with a peak value $V_{p2}$ and a pulse width $T_3$ is first applied to the liquid crystal during a period $T_3$ from time $t_1(=t_2)$ to time $t_{21}$, and a negative pulse voltage with a peak of $-V_{p3}$ and a pulse width $T_4$ is then applied to the liquid crystal during a period $T_4$ from time $t_{21}$ to time $t_3$. Values $T_1$, $T_2$, $T_3$, $T_4$, $V_0$, $V_{p1}$, $V_{p2}$ and $V_{p3}$ are specified in Table 2:

TABLE 2

| | T | | | | | | | |
|---|---|---|---|---|---|---|---|---|
| | $T_1$ | $T_2$ | $T_3$ | $T_4$ | $V_0$ | $V_{p1}$ | $V_{p2}$ | $V_{p3}$ |
| Ex 1 | 1.2 m sec | 1.8 m sec | | | 20V | 40V | 54V | 30V |
| | | 0.6 m sec | 0.5 m sec | 0.1 m sec | | | | |
| Ex 2 | 0.8 m sec | 1.4 m sec | | | 30V | 40V | 54V | 30V |
| | | 0.6 m sec | 0.5 m sec | 0.1 m sec | | | | |

During this time, the relationship between the DC component of the voltage $v_1$ applied to the liquid during the print period $T_1$ crystal and the DC component of the voltage $v_2$ applied during the drive period $T_2$ is identical to that of Equation (4) when exposed dots are formed, but is expressed by the following Equation (5) when unexposed dots are formed:

$$\int_{t_0}^{t_1} v_1 dt + \int_{t_2}^{t_3} v_2 dt = -V_0 \cdot T_1 + V_{p2} \cdot T_3 - V_{p3} \cdot T_4 = 0 \quad (5)$$

In the present embodiment, as well, the average value of the voltage applied to the liquid crystal is zero and has no DC component, so that deterioration of the liquid crystal, which is induced by an electrochemical reaction, does not occur.

In the present invention, moreover, a negative voltage is applied to the ferroelectric liquid crystal during the period $T_4$ in the drive period $T_2$, when the unexposed dots are formed in the condition utilizing the arrangement of polarizing axes of two polarizing plates 10a, 10b is shown in FIG. 4. As a result optical leakage during the drive period is reduced, is shown in FIG. 12(d), so much that the effect of optical leakage during the next one-line drive period is eliminated.

Figure 13:
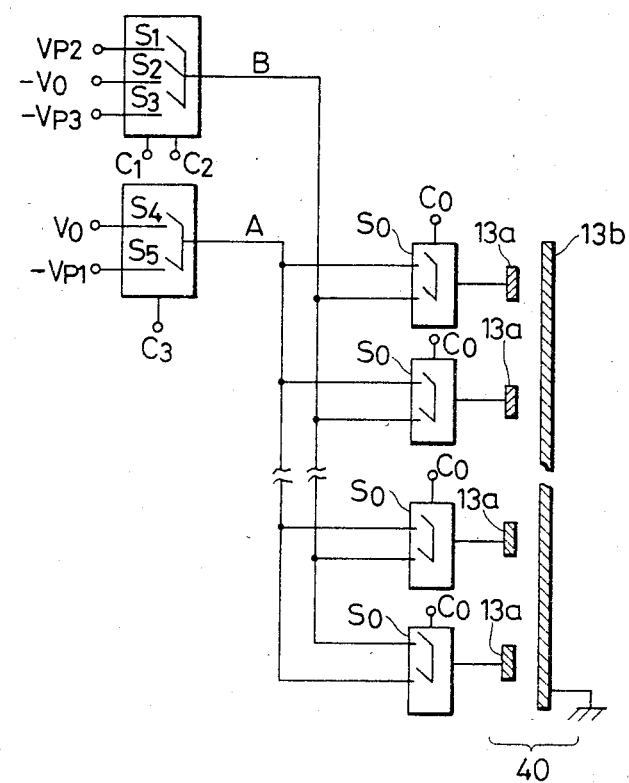

FIG. 13 shows on example of a specific circuit realizing the drive voltage waveform of FIG. 12.

Figure 14:
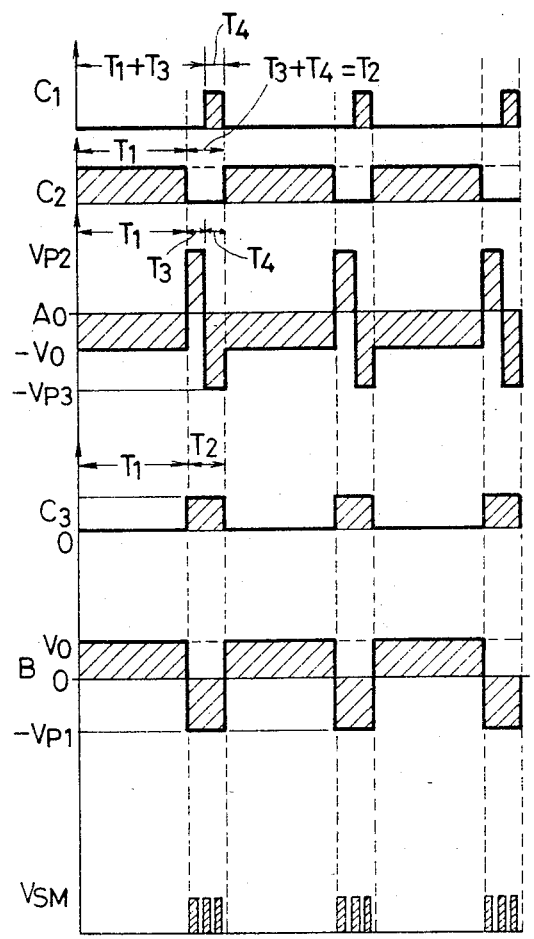

The timings of the individual signals in the circuit of FIG. 13 are specified in Table 3 and 4, and individual signal voltage waveforms are shown in FIG. 14. The waveform of an input signal $V_{SM}$ to the step motor 70 is also shown in FIG. 14.

One transparent conductive film 13a of a liquid-crystal switching element 40 is connected to a switch $S_0$ used for selecting between a signal A for the formation of exposed dots and a signal B for the formation of unexposed dots, in accordance with a control signal $C_0$. Another transparent conductive film 13b is held at a fixed potential (e.g., ground potential). The signal A for the formation of exposed dots is generated by selecting voltages $V_0$ and $-V_{p1}$ in accordance with a control signal $C_3$ by the actions of switches $S_4$ and $S_5$. The signal B for the formation of unexposed dots is generated by selecting voltages $V_{p2}$, $-V_0$ and $-V_{p3}$ in accordance with control signals $C_1$ and $C_2$ by the actions of switches $S_1$, $S_2$ and $S_3$:

TABLE 3

| $C_1$ | $C_2$ | $S_1$ | $S_2$ | $S_3$ | Output A |
|---|---|---|---|---|---|
| 0 | 0 | 1 | 0 | 0 | $V_{p2}$ |
| 0 | 1 | 0 | 1 | 0 | $-V_0$ |
| 1 | 0 | 0 | 0 | 1 | $-V_{p3}$ |

TABLE 4

| $C_3$ | $S_4$ | $S_5$ | Output B |
|---|---|---|---|
| 0 | 0 | 1 | $V_0$ |

TABLE 4-continued

| C$_3$ | S$_4$ | S$_5$ | Output B |
|---|---|---|---|
| 1 | 1 | 0 | $-V_{p1}$ |

Because of the mechanism of the printer, after the photoconductive member is printed, the photoconductive surface is moved and supplied with a toner so that a toner image is transferred to paper. It is therefore preferable that the period $T_1$ precedes the period $T_2$. If $T_3 < T_4$, moreover, optical leakage can be further prevented.

FIG. 15 is a voltage waveform chart of the second embodiment of the present invention during a two-line drive period.

Figure 15A:
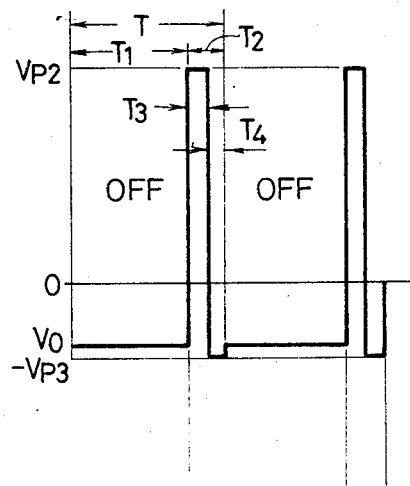
Figure 15B:
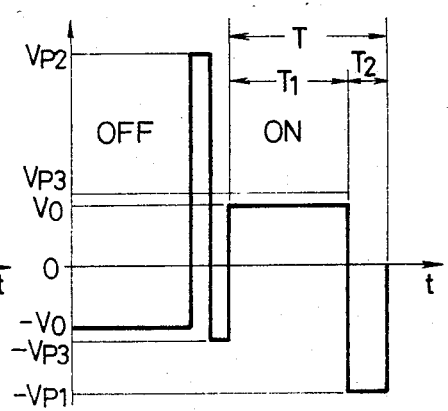
Figure 15C:
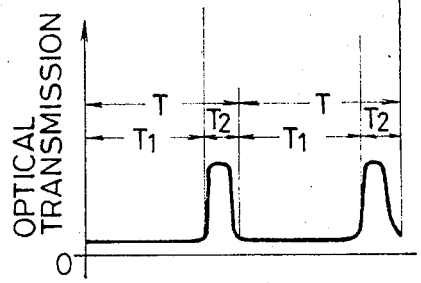
Figure 15D:
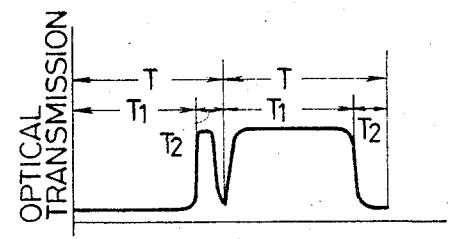

FIG. 15(a) shows the waveform of the voltage applied to the liquid crystal when unexposed dots are formed in the first print period (OFF), and unexposed dots are also formed in the next print period. FIG. 15(c) shows the optical transmission during that time. FIG. 15(b) shows the waveform of the voltage applied to the crystal when unexposed dots are formed in the first print period and exposed dots are formed in the next print period (ON).

EMBODIMENT 3

FIGS. 16 and 17 refer to a third embodiment of the present invention.

In this embodiment, the drive of the light source and the drive of the liquid-crystal switching element are synchronized with each other.

Figure 16A:
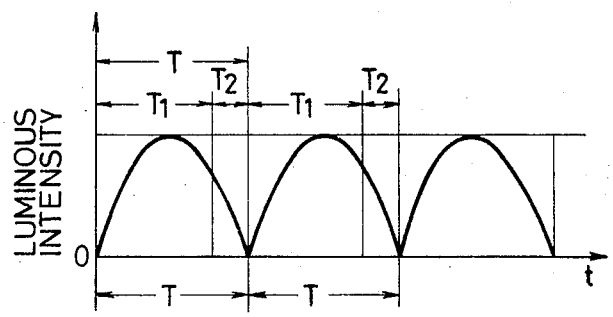

FIG. 16 shows the luminous intensity of the light source. In FIG. 16(a), the lighting voltage of the light source, such as a fluorescent lamp, is formed as a sine wave with a frequency of 1/2T, and the luminous intensity of the light source is reduced during the drive period $T_2$. FIG. 17(a) shows the waveform of the voltage applied to the liquid crystal when the drive is performed under drive conditions set by the light source of FIG. 16(a), and FIG. 17(b) shows the optical transmission during that time.

Figure 16B:
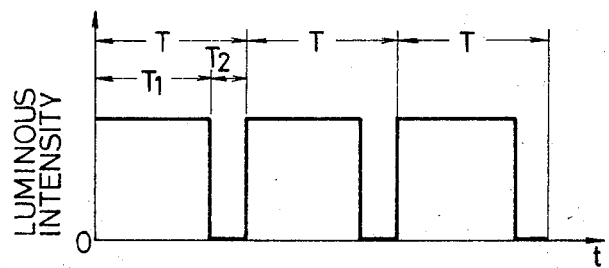

FIG. 16(b) shows a further improvement in which optical leakage can be eliminated by reducing the luminous intensity of the light source during the drive period $T_2$ to zero.

Figure 1:
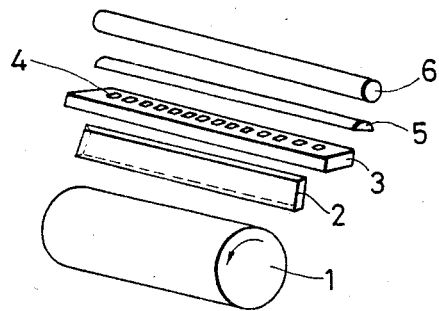
FIGS. 1 and 2 are views of the construction of a printer using the liquid-crystal switching element of the present invention.

Another method of making the intensity of the light from the light source entering the liquid-crystal switching element during the drive period $T_2$ weaker than that during the print period $T_1$, uses a shielding plate for blocking off the light during the period $T_2$ which is interposed between the liquid-crystal switching element 3 and the cylindrical lens 5 of FIG. 1, and is as effective as the method of FIGS. 16(a) and (b).

EMBODIMENT 4

Figure 18A:
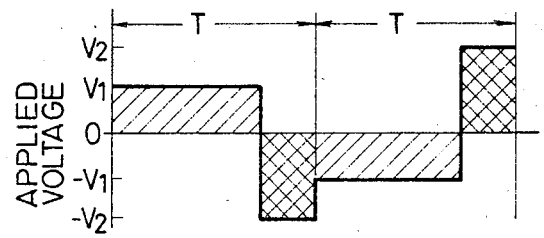
FIGS. 18 to 22 are views of the principle of the fourth embodiment of the present invention.
Figure 18B:
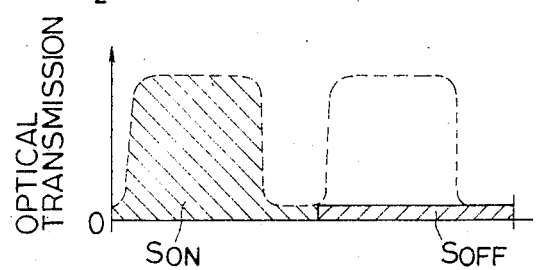

FIG. 18 shows the operating waveform of a fourth embodiment in which contrast is improved. The leakage of the transmitted light is remarkably reduced, as shown by $S_{OFF}$ in FIG. 18(B), during an OFF cycle by making the light coming from the light source 6 and incident on the liquid-crystal switching element into a pulse light which flashes in synchronism with the drive voltage waveform of the liquid-crystal switching element, as shown by a broken line. As a result, the liquid-crystal switching element can set the contrast ($=S_{ON}/S_{OFF}$) at a value higher than 10.

It is preferable that a fluorescent lamp is used as the light source for the liquid-crystal switching element, in view of the cost for, the life of and the lighting circuit of the light source. Especially, the fluorescent lamp is advantageous in that it can produce a variety of monochromatic lights such as blue, green, yellow or red by selecting the composition of the fluorescent substance, and in that it can be used in various ways in accordance with the characteristics of the photoconductive element used.

Figure 19:
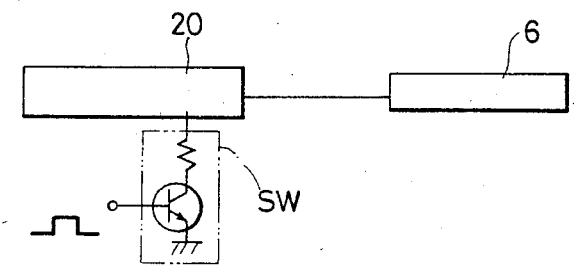

FIG. 19 shows the embodiment for establishing the waveform of FIG. 18, in which the light of the light source 6 such as the fluorescent lamp is flashed by interrupting the current flowing through the fluorescent lamp.

In FIG. 19, the lighting current is turned on and off by inputting a signal at a TTL level to a high-frequency lighter 20 to drive a switching circuit SW, so that the circuit is conductive at a high ("H") level and blocked at a low ("L") level.

Figure 20:
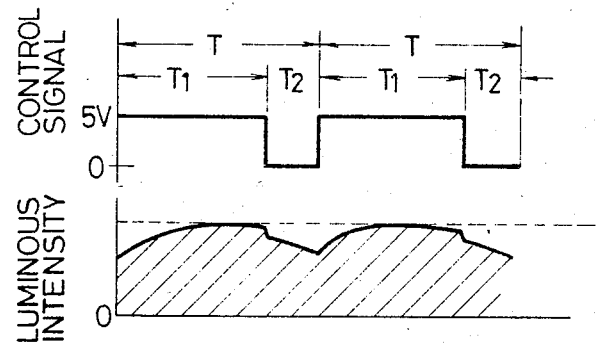

FIG. 20 shows the waveform obtained when the embodiment of FIG. 19 is operated, and shows the relationship between the waveform of the signal voltage and the change of the luminous intensity of the fluorescent lamp.

In these Figures, the embodiment is actually operated. In the present embodiment, the high-frequency lighter 20 is turned off to cut the current when the signal voltage reaches the "L" level at the period $T_2$. It is also found that the luminous intensity is slightly reduced because of the afterglow of the fluorescent substance so that the flashing light source as shown by the broken line in FIG. 18(B) cannot be obtained. This problem is naturally eliminated if the fluorescent lamp used has no afterglow. Since the fluorescent lamp available in the market is intended to have as much afterglow as possible, however, the above problem cannot be solved if that fluorescent lamp is used.

Therefore, the following means is adopted to solve the problem. The fluorescent lamp is lit at all times, and a ferroelectric liquid-crystal panel 21 is newly disposed in front of the liquid-crystal switching element 40, as shown in FIg. 21, so that optical pulses $I_0'$ transmitted through the liquid-crystal panel 21 may be generated, as shown by the flashing light in FIG. 18, by suitably selecting the waveform of the drive voltage $V_b$ of that panel 21.

Figure 21:
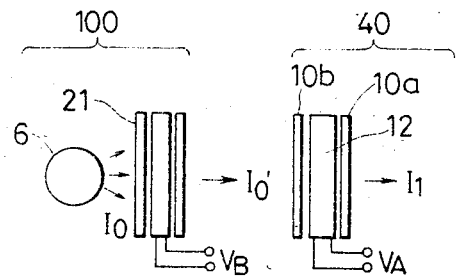
Figure 22:
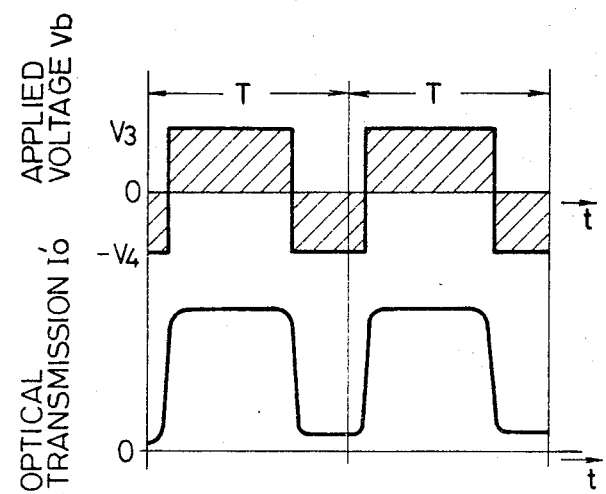

FIG. 22 is a characteristic graph showing the results of the printer of FIG. 21 and makes it apparent that a remarkably ideal flashing light is obtained. The ferroelectric liquid-crystal panel 21 will be called a "flashing-light transforming liquid-crystal panel". Thus, a light source system 100 is composed of the fluorescent lamp 6 as the light source and the flashing-light transforming liquid-crystal panel 21.

Figure 23:
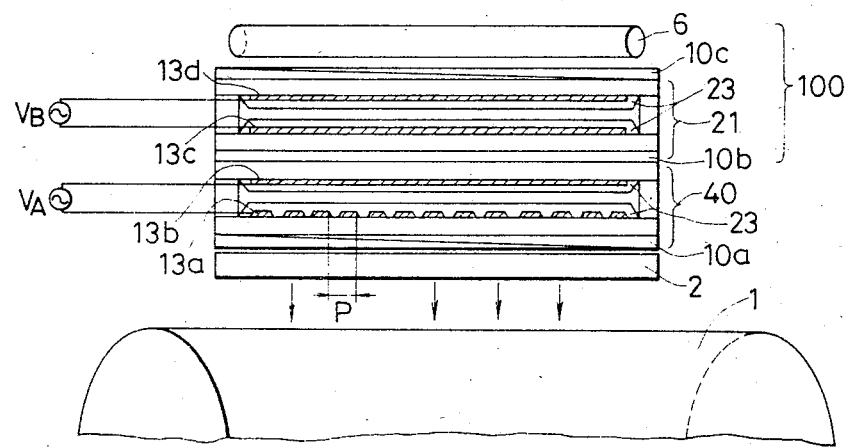
FIGS. 23 and 24 are a view of the construction embodying the fourth embodiment of the present invention and a waveform graph of the operations thereof.
Figures 24A, 24B, 24C:
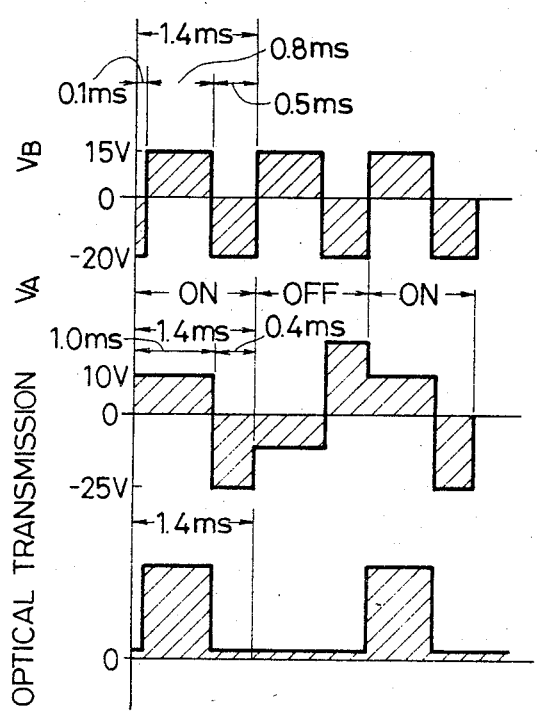

FIGS. 23 and 24(A) to (C) show the structure which is the embodiment explained in FIGS. 21 and 22, and the operations of that structure. FIG. 23 shows the structure of a light writing unit, and FIGS. 24(A) to (C) show the waveforms of the drive voltage of the embodiment of FIG. 23.

As shown, the light source system 100 is composed of the fluorescent lamp 6, the liquid-crystal panel 21 for transforming the light from the fluorescent lamp 6 into a flashing light, and the polarizing plates 10b and 10c. On the other hand, the liquid-crystal switching element 40 is composed of the polarizing plates 10a and 10b and the minute electrode substrates sandwiching the ferroelectric liquid crystal. The light writing unit is constructed of the light source system 100 (i.e., the fluorescent lamp 6 and the liquid-crystal panel 21), the liquid-crystal switching element 40, and the light focusing element 2. The liquid crystal 12 is the DOBAMBC in Table 1 and has a thickness of 4 μm. A orientation processing layer 23 is made of an organic rubbing film. The liquid-crystal switching element 40 has its 2,000 signal electrodes 13d arranged at a pitch of 100 μm. FIG. 24 shows the relationship between the drive voltage waveforms $V_B$ and $V_A$ of the liquid-crystal panels 21 and 40 and the optical pulses incident on the photoconductive drum 1 from the light source 6. The one-line drive period T is 1.4 ms, which correspond to the printing speed of 70 mm/s. The voltage waveforms $V_A$ and $V_B$ are generated on the basis of a clock signal from a computer and are synchronized with each other. Incidentally, the waveform $V_A$ takes that of repeated voltages of ON-OFF-ON. The temperature of the liquid-crystal panel is held at 80° C., at which the DOBAMBC exhibits SmC*. The measurements of the characteristics have revealed that the sum of the rise and fall times of the printing optical pulses is 0.5 ms, and that the contrast of 10 to 15 can be ensured.

Therefore, the printing experiments of the Se photoconductive drum 1 are conducted by using an aperture type blue fluorescent lamp of 30 W as the light source 6. It has been revealed that the print at a predetermined speed of 70 mm/s can be made, and that the structure of the present printing head is markedly promising.

EMBODIMENT 5

Figure 25:
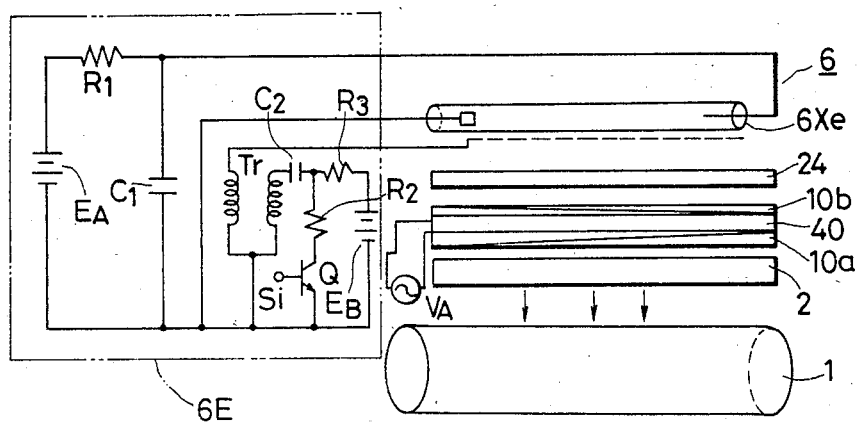
FIGS. 25 and 26 are a view of the construction of the fifth embodiment of the present invention and a waveform graph showing the operations thereof.
Figure 26:
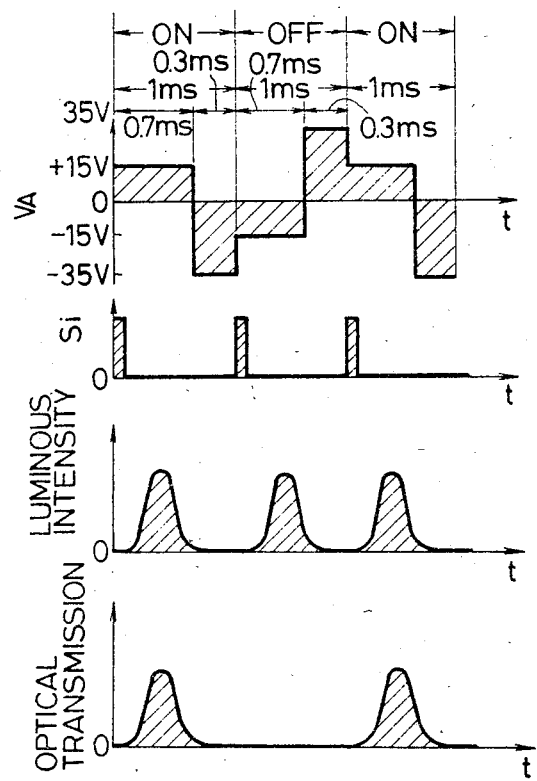

FIGS. 25 and 26 show a fifth embodiment of the present invention. FIG. 25 shows the structure, and FIG. 26 shows the waveforms of the operations of the structure of FIG. 25.

In FIG. 25, the light source 6 uses as the flashing light source a xenon flash lamp 6Xe of 500 W. A lighting light source 6E is composed of batteries $E_A$ and $E_B$, a transistor Q, resistors $R_1$ to $R_3$, capacitors $C_1$ and $C_2$, and a arc transformer $T_r$.

By inputing a lighting trigger signal Si to the base of the transistor Q, the xenon lamp 6 Xe is lit. The xenon lamp 6 Xe has a higher luminous energy than that of the fluorescent lamp by one or two order. Since the xenon lamp 6 has a high energy in the infrared zone, a bandpass filter 24 for cutting the infrared ray is interposed between the liquid-crystal switching element 40 and the xenon lamp 6Xe.

Thus, the light having passed through the liquid-crystal switching element selected on the basis of the data signal of the computer is focused on the surface of the photoconductive drum 1 by the action of the optical focusing element 2. Incidentally, the liquid-crystal switching element 40 used is the same as that used in the foregoing embodiments.

FIG. 26 shows the relationships of a xenon lamp lighting trigger signal $S_1$, the luminous pulses of the xenon lamp 6Xe, and the printing optical pulses with the voltage waveform $V_A$ which is applied to the signal electrode 13a and the common electrode 13b of the liquid-crystal switching element 40. According to this embodiment, the contrast can be higher than 10. Since the xenon lamp 6Xe has a much higher liminous energy than that of the fluorescent lamp, a higher-speed print than the foregoing embodiments was tried. The one-line drive time was 1 ms, which corresponds to the printing speed of 10 cm/s.

Moreover, the printing experiments using the OPC photoconductive drum as the photoconductive element have revealed that the print with a resolution of 10 lines/mm and a printing speed of 100 m/s could be sufficiently conducted.

This experimental example is suitable for a high-speed printing because the energy is higher than the case in which the fluorescent lamp is used, although the lighting system is enlarged.

Incidentally, in the foregoing first to fourth embodiments, the fluorescent lamp was used as the light source 6. Even in the other embodiments, however, in which the fluorescent lamp may be replaced by a halogen lamp or a xenon lamp (of continuous illuminating type), however, the same effects can be obtained by transforming the light of the light source into the flashing light by the use of the flashing-light transforming liquid-crystal panel. In this case, it is desired that the bandpass filter 24 for cutting the infrared ray be interposed between the light source 6 and the flashing-light transforming liquid-crystal panel 21.

In the embodiments of the present invention described above, a static drive has been used as an example. However, the present invention can also be applied to a dynamic drive such as sequential line scanning or sequential dot scanning.

In the first to fifth embodiments of the present invention thus far described, as shown in FIGS. 4 and 5, the direction 10b of the polarization axis of the polarizing plate is aligned with that of the long axes of the ferroelectric liquid crystal molecules when a negative voltage and an electric field of −E are applied thereto. However, the direction 10b can be aligned with that of the long axes of the liquid crystal molecules when a positive voltage and electric field E are applied. In this modification, the variations in brightness (i.e., the transmission and blocking) of the light are the reverse of those of the first to fifth embodiments.

As has been described hereinbefore, according to the present invention, it is possible to provide the drive method of a liquid-crystal switching element of a printer which can enable high-quality, high-speed printing.

What is claimed is:

1. A driving method for an optical printer having a liquid-crystal light switching element including a ferroelectric liquid crystal sandwiched between a pair of plates provided with electrodes on adjacent surfaces thereof, the liquid-crystal light switching element being disposed between light source means and a movable photosensitive surface and being switched so as to at least one of transmit and block light from the light source means to the photosensitive surface for enabling a printing operation, the method comprising the steps of applying voltages $v_1$ and $v_2$ to the liquid-crystal switching element substantially in accordance with the equation $$\int_{t_0}^{t_1} v_1 dt + \int_{t_2}^{t_3} v_2 dt = 0,$$

and controlling the intensity of light from the light source means incident on the liquid-crystal switching element so that incident light intensity during a period $T_2$ is weaker than the incident light intensity during a period $T_1$, where $t_0$, $t_1$, $t_2$ and $t_3$ represent times, $T_1$ ($= t_1 - t_0$) is the period during which a printing operation is effected, $T_2 (=t_3-t_2)$ is the period during which the photosensitive surface moves, $v_1$ is the voltage which is applied to the liquid-crystal switching element during the period $T_1$, and $v_2$ is the voltage which is applied to the liquid-crystal switching element during the period $T_2$.

2. The driving method according to claim 1, wherein $t_1=t_2$.

3. The driving method according to claim 1, wherein $T_1 \geq T_2$.

4. The driving method according to claim 1, wherein the voltage $v_2$ having a peak of one polarity is applied during at least a portion of the period $T_2$.

5. The driving method according to claim 4, wherein the peak of one polarity of the voltage $v_2$ is provided at the end of the period $T_2$.

6. The driving method according to claim 1, wherein the incident light intensity on the liquid-crystal switching element is controlled so that the incident light intensity during the period $T_2$ is substantially zero.

7. The driving method according to claim 1, wherein the ferroelectric liquid crystal is a liquid crystal having at least one of a chiral smectic C phase and a chiral smectic H phase.

8. The driving method according to claim 1, further comprising the step of driving the light source means to intermittently emit light incident onto the liquid-crystal switching element, and driving the light source means to emit light in synchronism with the switching of the liquid-crystal switching element.

9. The driving method according to claim 8, wherein the light source means is driven so as to emit light incident on the liquid-crystal switching element only during the period $T_1$.

10. An optical printer comprising a liquid-crystal light switching element including a ferroelectric liquid crystal sandwiched between a pair of plates provided with electrodes on adjacent surfaces thereof, the liquid-crystal switching element being disposed between light source means and a movable photosensitive surface and being switched so as to at least one of transmit and block light from the light source means to the photosensitive surface for enabling a printing operation, means for applying voltages $v_1$ and $v_2$ to the liquid-crystal switching element in accordance with the equation $$\int_{t_0}^{t_1} v_1 dt + \int_{t_2}^{t_3} v_2 dt = 0,$$

and means for controlling the intensity of light from the light source means incident on the liquid-crystal switching element so that incident light intensity during a period $T_2$ is weaker than the incident light intensity during a period $T_1$, where $t_0$, $t_1$, $t_2$ and $t_3$ represent times, $T_1 (=t_1-t_0)$ is the period during which a printing operation is effected, $T_2 (=t_3-t_2)$ is the period during which the photosensitive surface moves, $v_1$ is the voltage which is applied to the liquid-crystal switching element during the period $T_1$, and $v_2$ is the voltage which is applied to the liquid crystal element during the period $T_2$.

11. The optical printer according to claim 1, wherein $t_1=t_2$.

12. The optical printer according to claim 1, wherein $T_1 \geq T_2$.

13. The optical printer according to claim 1, wherein the voltage $v_2$ has a peak of one polarity during at least a portion of the period $T_2$.

14. The optical printer according to claim 13, wherein the peak of one polarity of the voltage $v_2$ is provided at the end of the period $T_2$.

15. The optical printer according to claim 1, wherein the means for controlling the intensity of the light incident on the liquid-crystal switching element controls the intensity of the light incident to be substantially zero during the period $T_2$.

16. The optical printer according to claim 1, wherein the ferroelectric liquid crystal is a liquid crystal having at least one of a chiral smectic C phase and a chiral smectic H phase.

17. The optical printer according to claim 1, further comprising means for driving the light source means so that the light source means provides light incident on the liquid-crystal switching element in synchronism with the switching of the liquid-crystal switching element.

18. The optical printer according to claim 17, wherein the means for driving the light source means enables the light source means to emit light incident on the liquid-crystal switching element only during the period $T_1$.

19. The optical printer according to claim 1, including means for moving the photosensitive surface during the period $T_2$.

* * * * *